United States Patent

Cox

[11] 3,937,136
[45] Feb. 10, 1976

[54] FILTER DEVICE FOR DEEP FAT FRYER

[76] Inventor: Elton D. Cox, 2875 Bannockburn, Memphis, Tenn. 38138

[22] Filed: Nov. 15, 1974

[21] Appl. No.: 524,191

Related U.S. Application Data

[63] Continuation-in-part of Ser. No. 431,934, Jan. 9, 1974, abandoned.

[52] U.S. Cl. .............................. 99/408; 210/493 R
[51] Int. Cl.² .......................................... A47J 37/12
[58] Field of Search ...... 99/408, 332, 403; 210/493, 210/DIG. 8, DIG.13

[56] References Cited
UNITED STATES PATENTS

| | | | |
|---|---|---|---|
| 902,181 | 10/1908 | Tidow | 99/408 |
| 2,071,467 | 2/1937 | Kouvallis | 99/408 |
| 2,136,535 | 11/1938 | Anetsberger | 99/408 |
| 3,107,601 | 10/1963 | Longmire | 210/DIG. 8 |
| 3,280,722 | 10/1966 | Rahauser | 99/332 |
| 3,477,361 | 11/1969 | Bradshaw | 99/408 |
| 3,793,813 | 2/1974 | McAllister | 210/493 |
| 3,827,566 | 8/1974 | Ponce | 210/493 |

*Primary Examiner*—Stanley N. Gilreath
*Assistant Examiner*—Arthur O. Henderson
*Attorney, Agent, or Firm*—John R. Walker, III

[57] ABSTRACT

A filter device intended to be fitted into a deep fat fryer to filter foreign particles from the hot liquid fat used in the cooking process. The device includes a pan that contains the liquid fat in which the food to be cooked is placed. The bottom of the pan is provided with an opening through which the fat passes outwardly as the pan is lifted from the deep fat fryer. Nestled within one embodiment of the pan and extending over at least a portion of the bottom thereof is a unit which establishes in part at least one channel through which also passes the fat as the pan is lifted. Another embodiment has the unit depending from the bottom of the pan. In either embodiment, a filter, having progressively smaller sized holes, is disposed within the channel for capturing and separating ever decreasing smaller size foreign particles from the fat.

21 Claims, 14 Drawing Figures

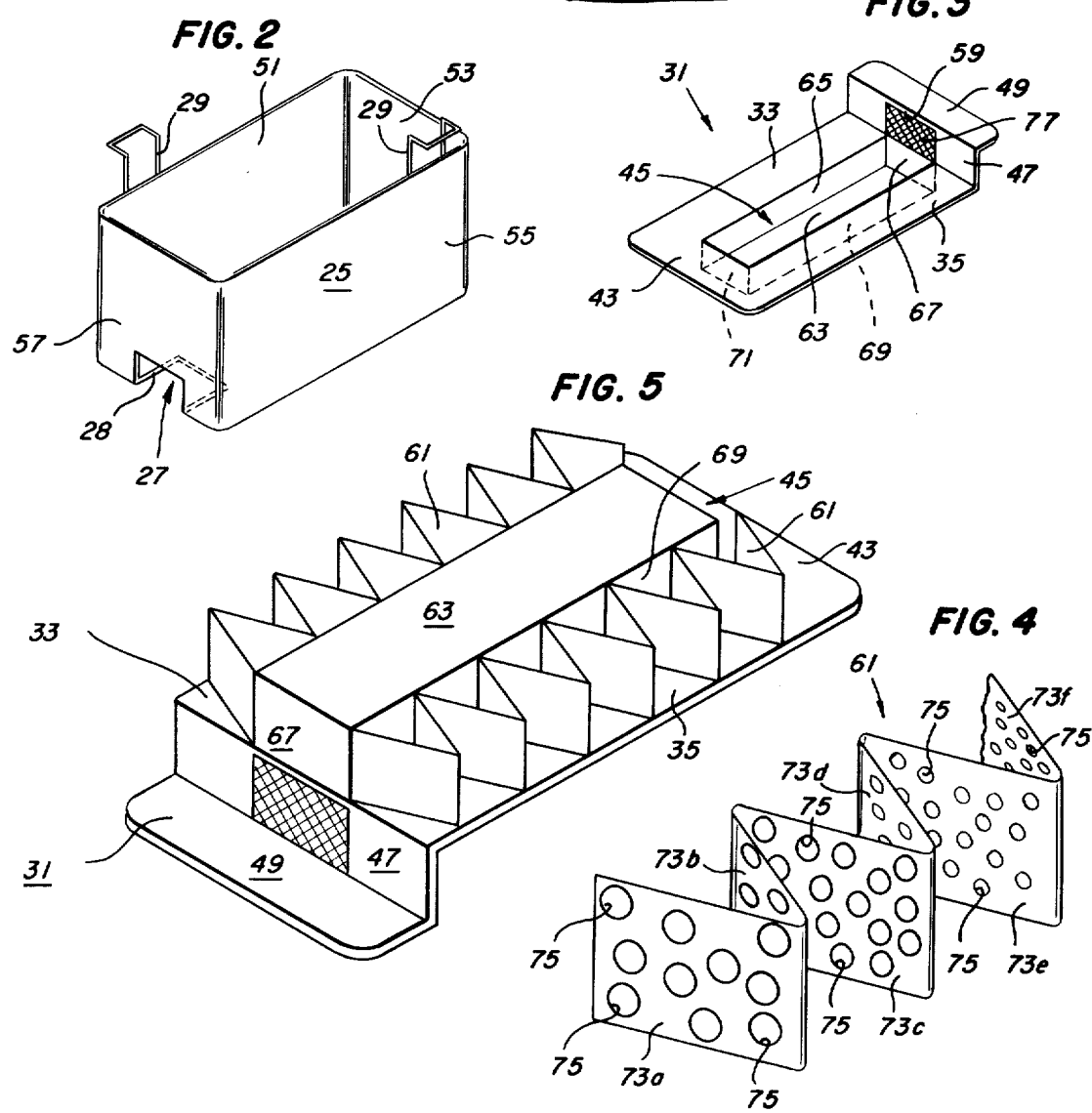

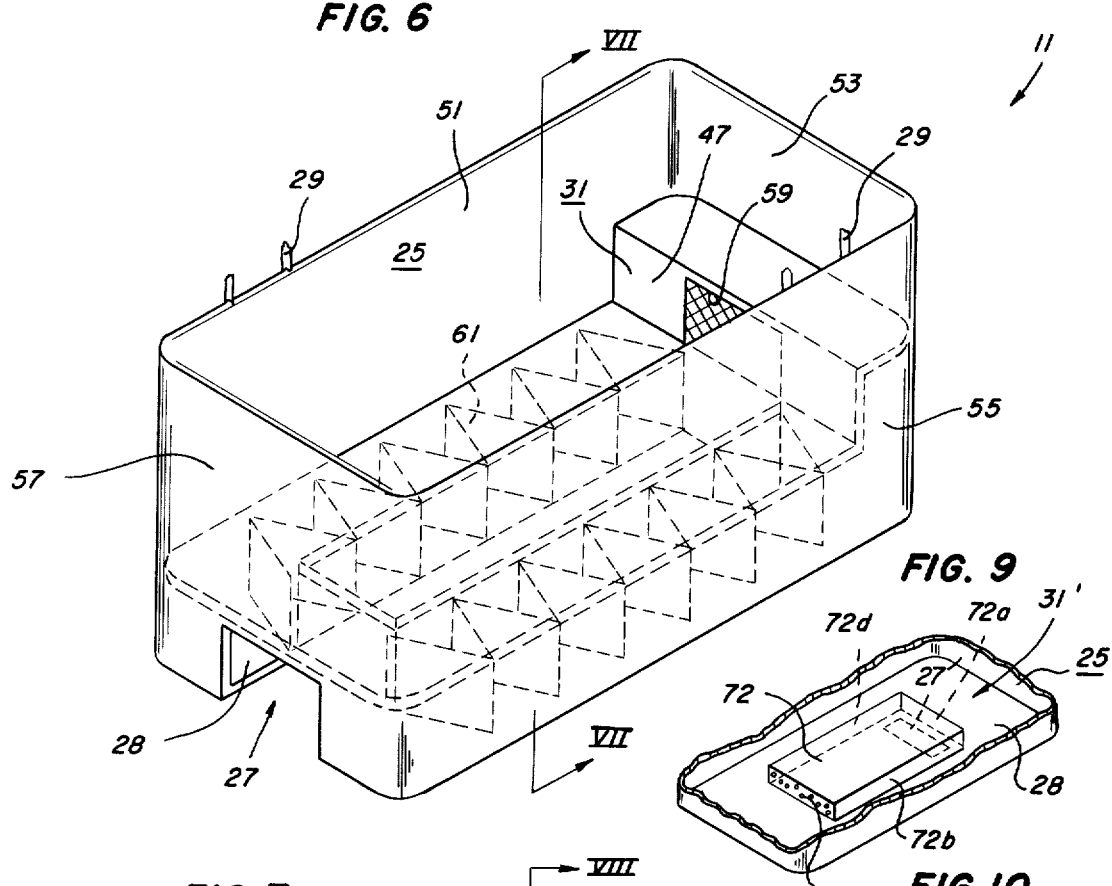

FILTER DEVICE FOR DEEP FAT FRYER

CROSS REFERENCE TO RELATED APPLICATION

This application is a continuation-in-part of my co-pending application Ser. No. 431,934, filed Jan. 9, 1974, now abandoned, entitled "Filter Device For Deep Fat Fryer".

BACKGROUND OF THE INVENTION

1. Field of the Invention

This invention relates to the field of filter devices for deep fat fryers.

2. Description of the Prior Art

Applicant is aware of the following U.S. patents: the Tidow, U.S. Pat. No. 902,181; the Vaglio, U.S. Pat. No. 1,880,603; the Weinberger, U.S. Pat. No. 1,998,797; the Overbeck et al., U.S. Pat. No. 2,635,527; and the Smith U.S. Pat. Nos. 2,716,938 and 2,716,939. None of the above patents suggest or disclose applicant's device.

As evidenced by the above patents, the usual practice for filtering devices for deep fat fryers is to completely screen the bottom of the cooking oil container. Certain of these prior devices required considerable time in replacing the filter or screen element. This precludes frequent removal of the foreign particles.

Applicant also has knowledge of deep fat fryers which have pumps for filtering the cooking oil. This latter type deep fat fryer requires a new filter each time the cooking oil is changed. The main objection to the pump type deep fat fryers is the cost, since the least expensive of this type fryer costs several hundred dollars.

When cooking chicken or other heavily breaded food substances in deep fat fryers, the heavy pieces of chicken usually drop to the bottom of the cooking oil. This stirs up the crumbs of the bread substance and adversely affects the taste of the food. Also, when these crumbs are allowed to remain in the cooking oil too long they burn or carbonate which breaks down the cooking oil. Only by frequent removal of these foreign particles can the cooking oil remain wholesome. Frequent removal of the foreign particles from typical deep fat fryers is not feasible for various well known reasons, e.g., the time required to empty the deep fat fryer to remove the foreign particles is excessive. Additionally, the filtering elements or screen baskets normally associated with prior devices are inadequate for removing the smaller foreign particles even when the time is taken to attempt to remove them. Accordingly, one recourse involves discarding the costly cooking oil rather frequently in order to avoid adversely affecting the flavor of the food substance.

SUMMARY OF THE INVENTION

The present invention is directed towards overcoming the disadvantages and problems relative to previous filtering devices for deep fat fryers, particularly the above mentioned problem which allows the crumbs from breaded food to remain in the cooking oil too long thus breaking down the cooking oil and requiring it to be discarded prematurely. The concept of the present invention is to provide a filter device which is simple in construction, inexpensive to manufacture, and extremely effective in filtering out foreign particles from used deep fat cooking oil or liquid fat to give the fat longer life and render it cleaner and more wholesome for cooking food therein.

The filter device herein described includes a pan that is nestled within a typical deep fat container. Filtering is achieved by lifting the filter device or the pan slowly out of the deep fat container, thus forcing the fat through a series of progressively smaller screens which filters out at least 90 percent of the foreign particles. The economy and safety of the filter device herein described is that the hot cooking oil can be cleaned and reused in approximately two minutes without having to remove the hot grease container or the cooking oil. Accordingly, the filtering device herein described will extend the normal life of the cooking oil approximately 50 percent or more if the oil is filtered at least every 8 hours of cooking time or more frequently with heavy cooking or with items having heavy breading, e.g., chicken or the like.

The filter device of the present invention includes the above mentioned pan that contains the liquid fat in which the food to be cooked is placed. The bottom of the pan is provided with an opening through which the fat passes outwardly as the pan is lifted from the deep fat container. Nestled within one embodiment of the pan and extending over at least a portion of the bottom thereof is a tray or unit which is provided with an aperture or passageway through which also passes the fat as the pan is lifted. Portions of the pan and unit define at least one channel communicated at the one end by the opening and at the remote end thereof by the aperture. Accordingly, the fat or cooking oil passes through the channel as the pan is lifted from the deep fat container.

Another embodiment has the unit depending from the bottom of the pan. In either embodiment, an angularly disposed filter, having progressively smaller size holes, is disposed within the channel for capturing and separating ever decreasing smaller size foreign particles from the fat. The larger size particles, being heavy, simply sink to the bottom. Either embodiment may include a sump for capturing and collecting these particles, although, the sump may be omitted if desired. The intermediate size particles are preferably separated from the fat by grid structure which may be placed across the passageway and/or the opening. The filter device herein described allows for rapid flow of the cooking oil through the channel or the filter elements to quickly facilitate displacement of the cooking oil therethrough.

DESCRIPTION OF THE DRAWINGS

FIG. 1 is a sectional view of the assembled filter device of the principal embodiment of the present invention shown fitted into a deep fat fryer with the view being taken as on a vertical plane through the center line of the deep fat fryer.

FIG. 2 is a perspective view of the pan of the present invention.

FIG. 3 is a perspective view of the tray or unit of the present invention.

FIG. 4 is a perspective view of the filter element of the present invention.

FIG. 5 is a perspective view showing the bottom of the unit and two of the filter elements being depicted in their preferred association therewith.

FIG. 6 is a perspective view of the filter device of the present invention in its entirety.

FIG. 7 is a sectional view taken as on the line VII—VII of FIG. 6.

FIG. 8 is a sectional view taken as on the line VIII—VIII of FIG. 7.

FIG. 9 is a fragmentary perspective view of a second embodiment showing the unit thereof relative to the pan.

FIG. 10 is a bottom view of the unit per se of the second embodiment of FIG. 9.

DESCRIPTION OF THE PREFERRED EMBODIMENT

Figure 11:
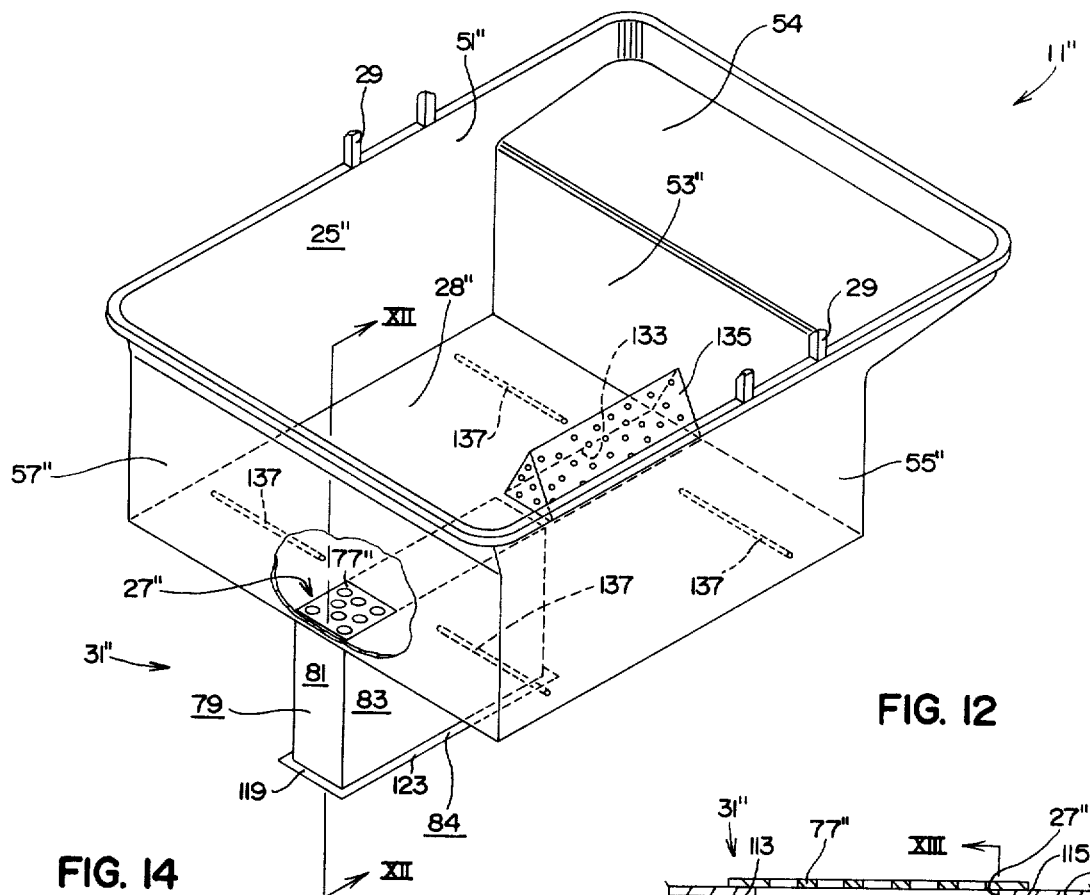
FIG. 11 is a perspective view of a third embodiment of the assembled filter device of the present invention.

The principal embodiment of the submergible filtering device of the present invention is depicted in FIG. 6 of the drawings in its entirety and is character referenced therein by the numeral 11. The filter device 11 is intended to be fitted into a deep fat fryer, as at 13, diagrammatically depicted in section lines in FIG. 1 of the drawings. An object of the filtering device 11 is to filter out foreign particles from used deep fat cooking oil or hot liquid fat, as at 12, to give the fat longer life and render it cleaner and more wholesome for cooking food therein. The deep fat fryer 13 preferably includes a typical deep fat container, as at 15, for holding a quantity of the liquid fat 12 used in the frying or cooking process. The deep fat container 15 usually is removably nestled in a well, as at 17, and the rim thereof usually includes a continuous outwardly directed flange, as at 19, which restingly engages suitable structure, i.e., a ledge 21, of the deep fat fryer 13.

The fryer 13 also includes a heating element, as at 23, which normally is submerged in the liquid fat 12 or in such manner well known to those skilled in the art. In this regard, it should be sufficient to simply state that the heating element 23 is usually conveniently fitted to the fryer 13 to enable it to be pivoted upwardly out of the deep fat container 15 to facilitate removing the container 15 for cleaning purposes and the like. Accordingly, pivoting the heating element 23 upwardly in the above described manner enables the filter device 11 of the present invention to be fitted into the deep fat container 15 in a manner about to be described.

The filter device 11 includes a pan 25 as shown in FIG. 2 for accomplishing the cooking process therein, i.e., the pan 25 is removably nestled within the deep fat fryer 13 or more specifically within the deep fat container 15 thereof as clearly shown in FIG. 1 of the drawings. The pan 25 is provided with an opening, as at 27, disposed adjacent the lowermost portion thereof with the opening 27 preferably extending over a portion of the bottom as at 28 of the pan 25 as clearly shown in FIG. 2 of the drawings. It should be understood that the opening 27 may, if desired, have the entire perimeter thereof defined by the bottom 28. On the other hand, the entire perimeter of the opening 27 may, if desired, be defined by portions of the pan 25 other than the bottom 28. Regardless of the exact location, the opening 27 allows passage therethrough of the liquid fat contained in the pan 25 as it is caused to be lifted upwardly from the deep fat fryer 13. In this regard, the filter device 11 preferably includes means, such as handle means 29, for facilitating submergence and emergence of the pan 25 into and out of the container 15 or more specifically the liquid fat 12 contained therein.

The device 11 also includes a unit 31, as shown in FIG. 3, which is removably nestled within the pan 25 as best viewed in FIG. 6, for directing the outwardly flowing liquid fat 12 along a predetermined course prior to passing through the opening 27 in a manner to be fully described. The unit 31 preferably includes at least one substantially horizontally disposed longitudinal flange member 33. However, the unit 31 may additionally include a second longitudinal flange member as at 35. The flange members 33, 35 are positioned a spaced distance above the bottom 28 of the pan 25 establishing at least one but preferably two channels 37, 39 defined in part by the pan 25 and the unit 31, as shown in FIG. 7 of the drawings.

From FIG. 3 of the drawings it may be seen that in addition to the longitudinal flange members 33, 35, the unit 31 preferably includes a lower lateral flange member 43 interconnecting one of the respective ends of the flange members 33, 35 one to the other. Additionally, the unit 31 preferably, but not necessarily, includes a sump means; as at 45, which will be fully described later in the specification; a vertical wall, as at 47; and an upper lateral flange member 49.

From FIG. 2 of the drawings it may be seen that in addition to the previously mentioned bottom 28, the pan 25 includes four vertical walls 51, 53, 55 and 57. Accordingly, it may readily be seen that the opening 27 preferably, but not necessarily, is disposed adjacent the lowermost portion of the wall 57 and it may, if desired, extend into a portion of the bottom 28. It should also be understood that in the event the two channels 37, 39 are provided, they are in parallel one with the other and are communicated one with the other at the remote ends thereof. In other words, the channels 37, 39 meet in the area adjacent the opening 27 and in the area behind the vertical wall 47 of the unit 31. However, as previously mentioned, the unit 31 may optionally be constructed whereby only one channel is provided, i.e., with a top member yet to be described.

The unit 31 or more specifically the vertical wall 47 thereof, is provided with an aperture or passageway 59 leading into the channels 37, 39 with the passageway 59 being disposed remote from the opening 27, i.e., the channels 37, 39 communicating the passageway 59 with the opening 27 whereby the liquid fat contained within the pan 25 is directed to first pass through the passageway 59 thence along the channels 37, 39 and ultimately passing through the opening 27 as the pan 25 is emerged from the liquid fat 12 which is retained in the deep fat container 15.

The device 11 also includes filter means, as at 61 shown in FIG. 4 of the drawings, disposed within the channel or channels 37, 39 for capturing and separating foreign particles from the liquid fat as the pan 25 is caused to be emerged therefrom.

The sump means 45 alluded to above is for the intended purpose of collecting the largest and the heaviest ones of the foreign particles and from FIGS. 3 and 5 of the drawings it may be seen that the sump means 45 preferably includes a bottom 63 and four walls 65, 67, 69 and 71. The sump means 45 per se may be omitted and the unit disposed centrally of the pan 25, as shown in FIG. 9. In this event, the large crumbs simply gravitate to the bottom 28 of the pan 25.

A second embodiment of the unit is herein disclosed and is character referenced in FIGS. 9, 10 by the numeral 31 having a prime suffix. This unit 31' of FIGS. 9 and 10 is constructed in such a manner that it does not cover the entire area of the bottom 28. Therefore, portions of the bottom surrounding the unit 31 effectively serve the same function as does the sump means 45. Also, it will be noted the unit 31' is box-like in construction with a top or plate-like member 72, and four sides, i.e., 72a, 72b, 72c and 72d, depending from top 72. Also, opening 27 is disposed in bottom 28 adjacent one end 72a of unit 31' and the opposite end 72c is perforated to provide a passage in the form of grid means to allow flow of liquid through unit 31' from one end thereof to the other along a single channel as opposed to the two channels of the principal embodiment.

Additionally, in unit 31' the filter means preferably includes numerous perforated members each of which having at least two elements 73, but individually comprise two elements 73 joined along one of the sides thereof to establish a V-shaped member 74. These V-shaped members 74 are arranged in relationship one with the other so as to resemble congruent spaced apart chevrons. The V-shaped members are conveniently arranged within the channel so that the outward flow of the liquid fat passing through the channel causes the foreign particles to first encounter the apex of each V-shaped member 74 whereby any accumulation of foreign particles is most likely to be concentrated adjacent the outer ends of the joined elements 73, i.e., the accumulation is not adjacent the apices thereof.

On the other hand, the filter means 61 may include only one perforated member, as clearly shown in FIG. 4 of the drawings. In either event, it should be understood that the holes 75 in the downstream elements 73 are smaller than are the holes 75 in the upstream elements 73, e.g., the downstream holes are small like the holes in the element 73f and the upstream holes are large like the holes in the element 73a, etc., shown in FIG. 4 of the drawings. Further, the elements 73 are disposed at an oblique angle with respect to the flow of the liquid fat passing through the channel. This causes the foreign particles to accumulate away from the center of the channel or adjacent the outer margins of the elements 73 thus the flow of the liquid fat is not appreciably obstructed.

It should be understood that other arrangements of the concept of the unit 31' are anticipated which are intended to be within the spirit and scope of the above disclosure. For example, the opening 27' (FIG. 9) may be suitably disposed to facilitate a duplication of the unit 31', although this arrangement is not shown. In other words, a second unit 31' could be disposed in an abutting relationship with the unit 31' shown, i.e., the two walls 72a abutting one another, so that both walls 72a overlie the opening 27'. This arrangement provides twice the filter area and speeds up the outward and inward flow of the liquid fat. Additionally, the two walls 72a may be deleted, if desired, in which event the duplicated units 31' preferably are integrally formed.

Further, the unit 31' preferably is removably attached to the pan 25 in any convenient manner known to those skilled in the art, e.g., by incorporating slide fasteners (not shown) or the like.

From FIGS. 3 and 7 of the drawings it may be seen that the corresponding sides of the flange members 33, 35 are joined to the upper edges of the opposite walls 65, 69 thus establishing at least in part the channels 37, 39. More specifically, the channel 37 is defined by portions of the wall 51, the bottom 28, the flange 33 and the wall 65. Further, the channel 39 is defined in part by the wall 55, the bottom 28, the flange 35 and the wall 69.

From FIG. 4 of the drawings it may be seen that the filter means 61 includes at least one perforated member having at least two elements 73 angularly displaced one from the other and are individually designated as 73a, 73b, 73c, etc. The elements 73 are provided with numerous holes, as at 75, of predetermined size to allow free passage therethrough of the liquid fat 12 and to preclude the passage therethrough of foreign particles that may be too large to pass therethrough.

Each of the channels 37, 39 have at least one of the filter means 61 disposed therein as clearly shown in FIGS. 5 and 7 of the drawings. The filter means 61 preferably is positioned in the channels 37, 39 in such a manner as to allow the outwardly flowing liquid fat to first pass through the element having the largest holes, e.g., 73a, as it flows along the channels 37, 39 thereby capturing ever decreasing sized foreign particles along the length of the element 61.

The filter device 11 also includes grid means, as at 77, for capturing certain sized foreign particles, i.e., for capturing the intermediate sized ones of the foreign particles. The grid means 77 covers the aperture or passageway 59 to provide for free passage of the liquid fat and only those foreign particles small enough to pass therethrough. It should be understood that the grid means 77 may optionally constitute one complete end of the unit 31, as shown in FIG. 9, and/or complete opposite ends when duplication of the unit 31' is desired, as previously mentioned. From FIGS. 1, 3 and 8 of the drawings it may be seen that the vertical walls 47, 67 and the grid means 77 are positioned substantially in the same plane, however, it will be appreciated that the grid means 77 and the passageway 59 are disposed above the wall 67.

From the above disclosure and a study of the drawings it may readily be seen that the assembled filter device 11 as depicted in FIG. 6 is easily fitted into the deep fat container 15, i.e., the heating element 23 simply being pivoted upwardly out of the container 15 in the usual manner. The pan 25, the unit 31, and the filter means or member 61 preferably are formed from a durable non-rusting metal, such as stainless steel or the like which facilitates long life, enabling them to be rapidly cleaned in any well known manner. Accordingly, the filter means 61 preferably does not define sharp angles adjacent the joined elements 73 but rather has the adjacent elements 73 joined by a smooth continuous radius to facilitate cleaning the foreign particles from the apices defined by adjacent elements 73.

Obviously, in order to expedite the filtering process it is recommended that spare filter devices 11 be provided. Also, the holding pan 25 preferably has a size and shape closely conforming to that of the deep fat container 15. Accordingly, since the size and shape of the deep fat containers usually are peculiar to the particular manufacturer, the filter device 11 as above disclosed may have numerous variations in size and shape, however, the above disclosed concepts and the relationships of the various structural elements remains unchanged irrespective of which name brand the filter device 11 is intended to be compatible with.

Figure 14:
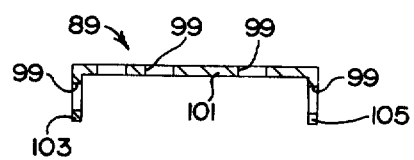
FIG. 14 is a sectional view taken as on the line XIV—XIV of FIG. 13.
Figures 12, 13:
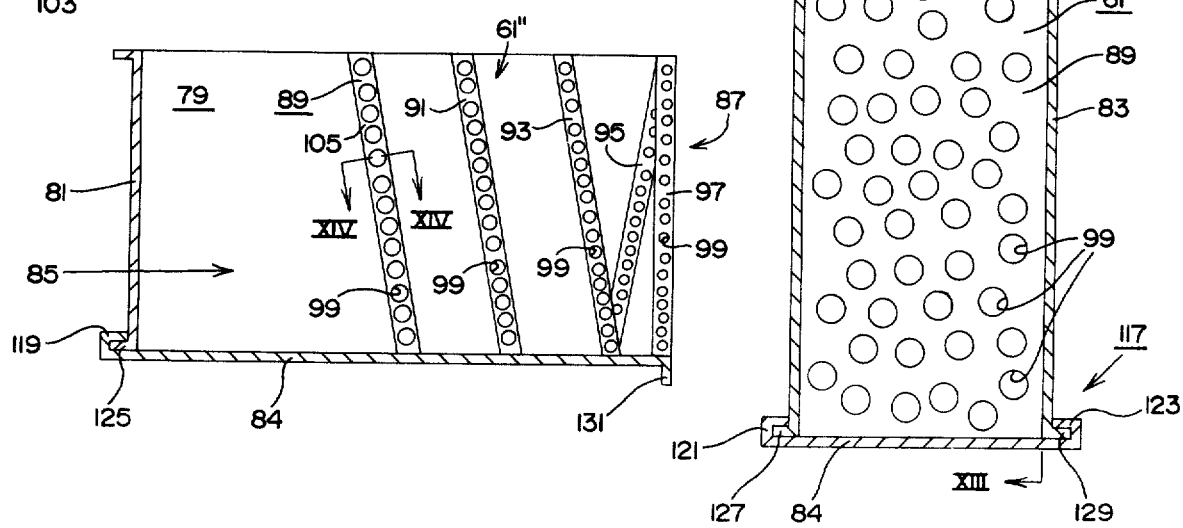
FIG. 12 is a sectional view taken as on the line XII—XII of FIG. 11.
FIG. 13 is a sectional view taken as on the line XIII—XIII of FIG. 12.

A third embodiment of the device 11 is herein disclosed and is character referenced in FIG. 11 of the drawings by the numeral 11 having a double prime suffix. FIGS. 12-14 of the drawings depict structure associated with the device 11" which will be fully disclosed as the specification proceeds.

The filtering device 11" includes a pan 25" which serves the same function as the previously disclosed pan 25. From FIG. 11 of the drawings it may be seen that the pan 25" includes a bottom 28" and four vertical walls 51", 53", 55" and 57". It should be mentioned that the wall 53" terminates upwardly thereof at a shelflike foam area 54 which has no function with respect to the device 11". However, it should be understood that any one, or two, or all of the walls 51", 53", 55" and 57" may terminate upwardly thereof at respective shelflike foam areas, or the shelflike foam area 54 may be deleted completely if desirable. The bottom 28" is provided with a first opening 27" which corresponds to the opening 27 fully described for the principal embodiment. The device 11" includes a unit 31" positioned beneath the pan 25" and, being removably attached thereto, cooperates with the first opening 27" for directing the outwardly flowing liquid fat 12 along a predetermined course, i.e., the liquid fat fills the pan 25" in like manner as shown in FIG. 1 for the pan 25. Also, it will be noted that the unit 31" is box-like in construction having a main body member 79 which is provided with an upwardly directed opening defined in part by a plurality of side panel members, as at 81, 82 and 83. The unit 31" includes a substantially horizontally disposed plate-like member 84 positioned a spaced distance below the bottom 28" of the pan 25" to establish at least one channel 85 which is defined in part by the bottom 28" of the pan 25" and the unit 31". The unit 31" is provided with a passageway, as at 87, leading into the channel 85. The passageway 87 preferably is established by having the end of the main body member 79 opposite end 81 open. Therefore, the passageway 87 is disposed remote from the first opening 27". The channel 85 communicates the passageway 87 and the first opening 27" one with the other for directing the outwardly flowing liquid fat 12 to ultimately pass through the passageway 87 after first passing through the first opening 27" thence along the channel 85 as the pan 25" is caused to be lifted upwardly as previously described for the principal embodiment.

From FIGS. 12-14 of the drawings it may be seen that the device 11" also includes filter means 61" disposed within the channel 85 for accomplishing the same purpose as the previously described filter means 61.

The filter means 61" includes a series of elements, as at 89, 91, 93, 95 and 97, which individually are provided with numerous holes, as at 99, of predetermined size to allow free passage therethrough of the liquid fat 12 and to preclude the passage therethrough of foreign particles that may be too large to pass therethrough.

From FIG. 14 of the drawings it may be seen that the filter element 89 includes a filter face portion 101 with opposite side margin portions thereof turned down to establish a pair of flange portions 103, 105. Accordingly, the flange portion 105 shown in FIG. 13 of the drawings depicts the holes 99 provided in the filter element 89. It should be understood that each of the remaining filter elements 91, 93, 95, 97 include corresponding flange portions, as shown in FIG. 13, which conveniently depict the holes 99 provided therein. Further, the corresponding filter face portions (not shown) of the elements 91, 93, 95 and 97 have numerous holes 99 of proportionate sizes as those shown on the flange portions thereof.

The holes 99 provided in the series of elements 89, 91, 93, 95 and 97 are progressively smaller in size commencing with any one of the elements, e.g., the element 89, to the succeeding ones thereof, as at 91. From FIG. 13 of the drawings it may readily be seen that the series of elements 89, 91, 93, 95 and 97 are positioned in the channel 85 to allow the outwardly flowing liquid fat 12 to first pass through the largest of the holes 99 as it flows along the channel 85 thereby capturing ever decreasing size foreign particles along the length thereof. It should be noted that the spaced distance between the side wall 81 and the element 89 is at least as great as the size of the opening 27".

From FIG. 11 of the drawings it may readily be seen that the first opening 27" is in the form of first grid means 77" for capturing certain size foreign particles and for allowing free passage therethrough of the liquid fat 12 and those foreign particles small enough to pass therethrough. Additionally, it should be understood that the passageway 87 preferably is in the form of the previously mentioned filter element 97. Additionally, the respective flange portions alluded to above for each of the filter elements 89, 91, 93, 95 corresponding to the flanges 103, 105 preferably are fixedly attached to the confrontingly arranged side panel members 82, 83 in any well known manner as by welding or the like. The main body member 79 is removably attached to the pan 25" by a pair of fixedly attached track like members 109, 111, i.e., the main body member 79 having outwardly directed flange portions 113, 115 for respectively engaging the track like members 109, 111 as clearly shown in FIG. 12 of the drawings.

The unit 31" preferably includes means, as at 117, for removably attaching the horizontally disposed plate like member 84 to the main body member 79 to facilitate frequent cleaning of the unit 31". However, the unit 31" may optionally be integrally constructed in which case the member 84 is fixed. When the member 84 is removable, the attachment means 117 includes doubling back side margin portions, as at 119, 121, 123 of the plate like member 84 for slidably engaging outwardly directed flange portions 125, 127, 129 respectively of the main body member 79.

From FIG. 13 of the drawings it may readily be seen that the elements 89, 91, 93, and 95 are obliquely disposed with respect to the flow of the liquid fat 12 therethrough. Additionally, it may be seen that the plate like member 84 has a margin portion thereof, as at 131, turned down to provide a tab like handle for sliding the plate like member 84 to and fro, i.e., when removing the plate like member 84 from the main body member 79 and replacement thereof. It should be understood that the physical size of the pan 25" determines whether or not the member 84 is removable or not, i.e., if proper cleaning can be achieved without necessitating removal of the member 84, it would then be fixed.

From FIG. 11 of the drawings it may be seen that the pan 25" or more specifically the bottom 28" thereof is provided with a second opening, as at 133, for also allowing the passage therethrough of the liquid fat 12 as the pan 25" is caused to be lifted in the manner previously described. However, it will be appreciated that the second opening 133 is in the form of second grid means 135 for allowing the heat to be more evenly distributed throughout the content of the pan 25" and for allowing free passage therethrough of the liquid fat 12, i.e., allowing for transfer of heated liquid fat into the pan 25''. Also, the second opening 133 and the grid means 135 facilitates locating typical thermostats or heating elements below the bottom 28'' and allows for more rapid flow of the cooking oil or liquid fat 12 into and out of the pan 25'' when raising and/or lowering the pan 25'' out of or into the fryer 13. In this regard, it should be emphasized that the interstitial pattern of the second grid means 135 is smaller mesh than that of the first grid means 77''. In other words, the interstitial pattern of the second grid means 135 is substantially identical in size to the holes 99 provided in the filter element 97, i.e., to assure that the filtering process of the filter means 61'' is not adversely affected.

FIG. 11 of the drawings also depicts the second grid means 135 suitably arranged so as to protrude upwardly a predetermined distance from the lowermost portion of bottom 28'' of the pan 25'' to allow free passage through at least the upper portion of the second grid means 135 even though its lower portion may be totally blocked with foreign particles which are too large to pass therethrough. The second grid means 135 is conveniently shown as triangular shaped, however, it should be understood that the shape of the second grid means 135 may depart from that depicted, e.g., it may be flat, without departing from the spirit and scope of the invention. Additionally, the second grid means 135 and the opening 133 may be deleted, if desirable.

The device 11'' preferably includes spacer means, as at 137, for preventing the bottom 28'' of the pan 25'' from engaging certain structure, e.g., external heating element or the like, of the deep fat fryer 13. The spacer means 137 preferably consists of elongated rod like members fixedly attached to the underneath surface of the bottom 38'' in any well known manner as by welding or the like.

Although the invention has been described and illustrated with respect to preferred embodiments thereof, it is to be understood that it is not to be so limited since changes and modifications may be made therein which are within the full intended scope of the invention.

I claim:

1. In combination with a deep fat fryer having a deep fat container for holding a quantity of liquid fat used in the frying process, of a submergible filtering device, for filtering foreign particles from the liquid fat, said submergible filter device comprising a pan for accomplishing the cooking process therein, said pan being provided with at least one opening disposed adjacent the lowermost portion thereof, means for facilitating submergence and emergence of said pan into and out of the liquid fat, the liquid fat being caused to pass through said opening to fill said pan with the fat as said pan is being submerged therein and to empty said pan as it is being emerged therefrom, a unit removably engaging said pan and cooperating with said opening thereof for directing the outwardly flowing liquid fat along a predetermined course, said unit having at least one substantially horizontally disposed plate-like member positioned a spaced distance from the bottom of said pan and establishing at least one channel defined in part by said pan and said unit, said unit being provided with a passageway leading into said channel with said passageway being disposed remote from said opening; said channel communicating said passageway with said opening whereby the liquid fat contained within said pan is directed to pass through said opening, said passageway, and along said channel in a predetermined sequence as said pan is emerged from the liquid fat; and filter means disposed within said channel for capturing and separating foreign particles from the liquid fat as said pan is caused to be emerged therefrom.

2. The combination of claim 1 in which said filter means includes at least one perforated member having at least two elements which are provided with numerous holes of predetermined size to allow free passage therethrough of the liquid fat and to preclude the passage therethrough of foreign particles that may be too large to pass therethrough.

3. The combination of claim 2 in which the holes provided in said perforated member are progressively smaller in size from one of said elements to the next, said perforated member being positioned in said channel to allow the outwardly flowing liquid fat to first pass through the largest of these holes as it flows along said channel thereby capturing ever decreasing sized foreign particles along the length thereof.

4. The combination of claim 1 in which said passageway is in the form of grid means for capturing certain size foreign particles and for allowing free passage therethrough of the liquid fat and only those foreign particles small enough to pass therethrough.

5. The combination of claim 1 in which is included sump means for collecting the largest and heaviest ones of the foreign particles, said sump means being disposed subjacent said passageway provided in said unit whereby the largest and heaviest ones of the foreign particles are captured within said sump means ahead of said passageway as said pan is lifted upwardly from the deep fat fryer.

6. The combination of claim 2 in which said elements are obliquely disposed with respect to the flow of the liquid fat therethrough.

7. A submergible filtering device for fitting into a deep fat fryer to filter foreign particles from the liquid fat used in the cooking process, said filtering device comprising a pan for accomplishing the cooking process therein, said pan being provided with at least one opening disposed adjacent the lowermost portion thereof for allowing passage therethrough of the liquid fat contained therein as said pan is caused to be lifted upwardly from the deep fat fryer, a unit removably engaging said pan and cooperating with said opening thereof for directing the outwardly flowing liquid fat along a predetermined course, said unit having at least one substantially horizontally disposed plate-like member positioned a spaced distance from the bottom of said pan and establishing at least one channel defined in part by said pan and said unit, said unit being provided with a passageway leading into said channel with said passageway being disposed remote from said opening in said pan; said channel communicating said passageway and said opening one with the other for directing the outwardly flowing liquid fat to pass through said opening, said passageway, and along said channel in a predetermined sequence as said pan is caused to be lifted upwardly from the deep fat fryer; and filter means disposed within said channel for capturing and separating foreign particles from the liquid fat as the liquid fat flows outwardly through said channel.

8. The device of claim 7 in which said filter means includes at least one perforated member having at least two elements which are provided with numerous holes of predetermined size to allow free passage therethrough of the liquid fat and to preclude the passage therethrough of foreign particles that may be too large to pass therethrough.

9. The device of claim 8 in which the holes provided in said perforated member are progressively smaller in size from one of said elements to the next, said perforated member being positioned in said channel to allow the outwardly flowing liquid fat to first pass through the largest of these holes as it flows along said channel thereby capturing ever decreasing sized foreign particles along the length thereof.

10. The device of claim 7 in which said passageway is in the form of grid means for capturing certain size foreign particles and for allowing free passage therethrough of the liquid fat and those foreign particles small enough to pass therethrough.

11. The device of claim 7 in which is included sump means for collecting the largest and heaviest ones of the foreign particles, said sump means being disposed subjacent said passageway provided in said unit whereby the largest and heaviest ones of the foreign particles are captured within said sump means ahead of said passageway as said pan is lifted upwardly from the deep fat fryer.

12. The device of claim 8 in which said elements are obliquely disposed with respect to the flow of the liquid fat therethrough.

13. A submergible filtering device for fitting into a deep fat fryer to filter foreign particles from the liquid fat used in the cooking process, said filtering device comprising a pan for accomplishing the cooking process therein, said pan being provided with a first opening disposed adjacent the lowermost portion thereof for allowing passage therethrough of the liquid fat contained therein as said pan is caused to be lifted upwardly from the deep fat fryer, a unit positioned beneath said pan and being removably attached thereto and cooperating with said first opening thereof for directing the outwardly flowing liquid fat along a predetermined course, said unit having at least one substantially horizontally disposed plate-like member positioned a spaced distance below the bottom of said pan and establishing at least one channel defined in part by said pan and said unit, said unit being provided with a passageway leading into said channel with said passageway being disposed remote from said first opening in said pan, said channel communicating said passageway and said first opening one with the other for directing the outwardly flowing liquid fat to ultimately pass through said passageway of said unit after first psssing through said first opening thence along said channel as said pan is caused to be lifted upwardly from the deep fat fryer, and filter means disposed within said channel for capturing and separating foreign particles from the liquid fat as the liquid fat flows outwardly through said channel.

14. The device of claim 13 in which said filter means includes a series of elements which individually are provided with numerous holes of predetermined size to allow free passage therethrough of the liquid fat and to preclude the passage therethrough of foreign particles that may be too large to pass therethrough.

15. The device of claim 14 in which said holes provided in said series of elements are progressively smaller is size from any one of said elements to the succeeding ones thereof whereby said series of elements are positioned in said channel to allow the outwardly flowing liquid fat to first pass through the largest of these holes as it flows along said channel thereby capturing ever decreasing size foreign particles along the length thereof.

16. The device of claim 13 in which said first opening is in the form of first grid means for capturing certain size foreign particles and for allowing free passage therethrough of the liquid fat and those foreign particles small enough to pass therethrough.

17. The device of claim 16 in which said pan is provided with a second opening disposed adjacent the lowermost portion thereof for allowing passage therethrough of the liquid fat contained therein as said pan is caused to be lifted upwardly from the deep fat fryer, said second opening being in the form of second grid means for capturing certain size foreign particles and for allowing free passage therethrough of the liquid fat, the interstitial pattern of said second grid means being smaller mesh than that of said first grid means.

18. The device of claim 17 in which said second grid means is arranged so as to protrude upwardly a predetermined distance from the lowermost portion of said pan to allow free passage through at least the upper portion thereof even though its lower portion may be totally blocked with foreign particles which are too large to pass therethrough.

19. The device of claim 13 in which is included spacer means fixedly attached to the underneath surface of the bottom of said pan for preventing the bottom of said pan from engaging certain structure of the deep fat fryer.

20. The device of claim 13 in which said unit includes a main body member removably attached to said pan, and means for removably attaching said horizontally disposed plate-like member to said main body member to facilitate frequent cleaning of said unit.

21. The device of claim 14 in which said elements are obliquely disposed with respect to the flow of the liquid fat therethrough.

* * * * *